(12) United States Patent
Kim et al.

(10) Patent No.: US 8,270,497 B2
(45) Date of Patent: Sep. 18, 2012

(54) COMPLEMENTING BITSTREAM ERROR AND DECODING

(75) Inventors: Jeong Kwon Kim, Gyeonggi-Do (KR); Seung Pyo Shin, Gyeonggi-Do (KR)

(73) Assignee: Core Logic, Inc., Seoul (KR)

( * ) Notice: Subject to any disclaimer, the term of this patent is extended or adjusted under 35 U.S.C. 154(b) by 875 days.

(21) Appl. No.: 12/363,599

(22) Filed: Jan. 30, 2009

(65) Prior Publication Data
US 2009/0201999 A1 Aug. 13, 2009

(30) Foreign Application Priority Data
Jan. 30, 2008 (KR) .................. 10-2008-0009674

(51) Int. Cl.
*H04N 7/12* (2006.01)

(52) U.S. Cl. ......... 375/240.27; 375/240.01; 375/240.25; 375/240.26; 382/232; 382/233; 382/234; 382/235

(58) Field of Classification Search ............. 375/240.01, 375/240.25, 240.26, 240.27; 382/232–235
See application file for complete search history.

(56) References Cited

U.S. PATENT DOCUMENTS

| 7,979,826 B1 * | 7/2011 | Trimberger ............ 716/117 |
| 2005/0196053 A1 * | 9/2005 | Pore et al. ............ 382/233 |
| 2007/0130603 A1 * | 6/2007 | Isomura et al. ............ 725/131 |

FOREIGN PATENT DOCUMENTS

| JP | 2007-336382 A | 12/2007 |
| KR | 10-0747716 B1 | 8/2007 |

* cited by examiner

*Primary Examiner* — Yin-Chen Shaw
*Assistant Examiner* — Roderick Tolentino
(74) *Attorney, Agent, or Firm* — The Nath Law Group; Joshua B. Goldberg; Stanley N. Protigal

(57) ABSTRACT

Among other things, techniques, systems and apparatus are described for complementing a bitstream error so that a hardware decoder can stably decrypt a bitstream. A method of complementing a bitstream error includes: receiving a bitstream; detecting an error in the received bitstream; and complementing the detected error, before decrypting the bitstream.

18 Claims, 6 Drawing Sheets

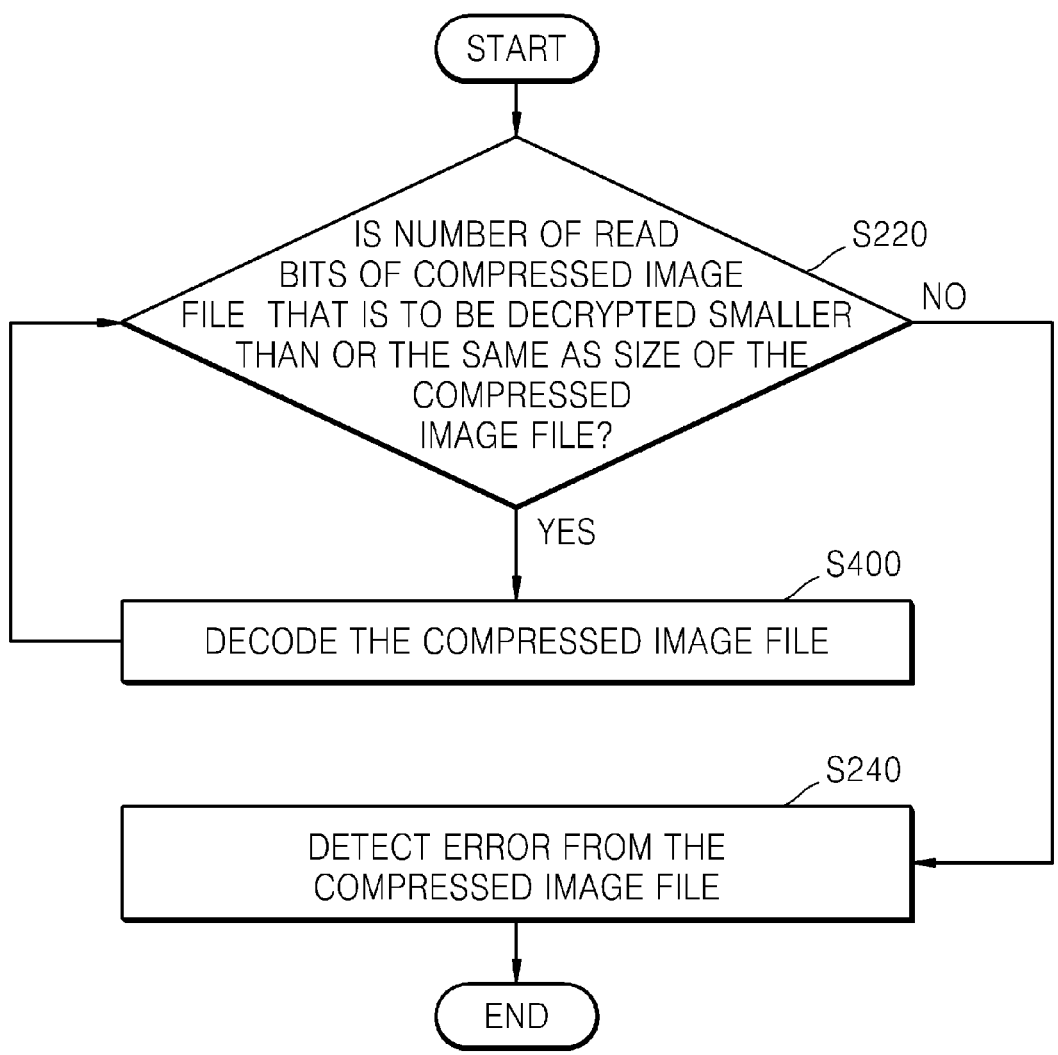

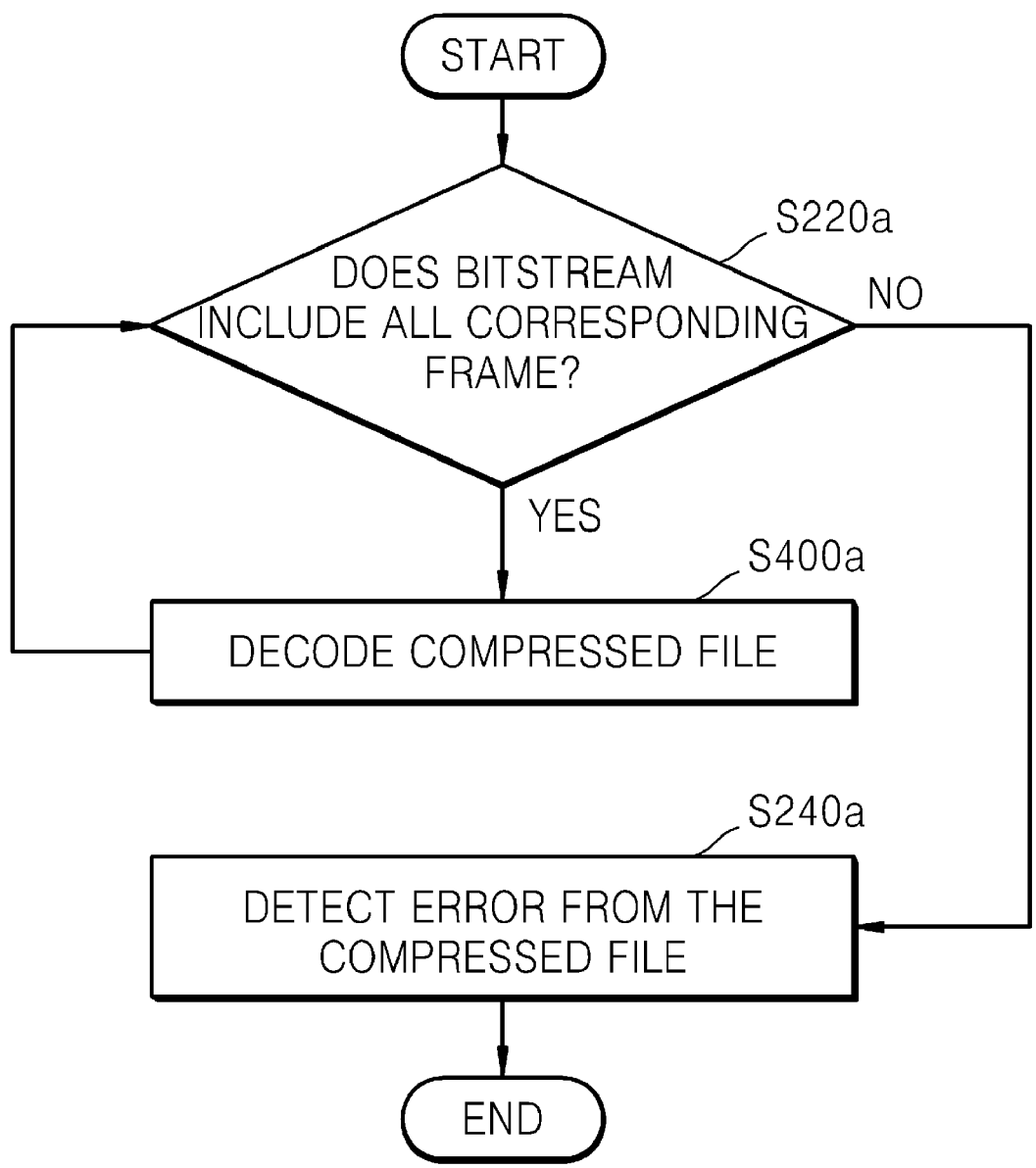

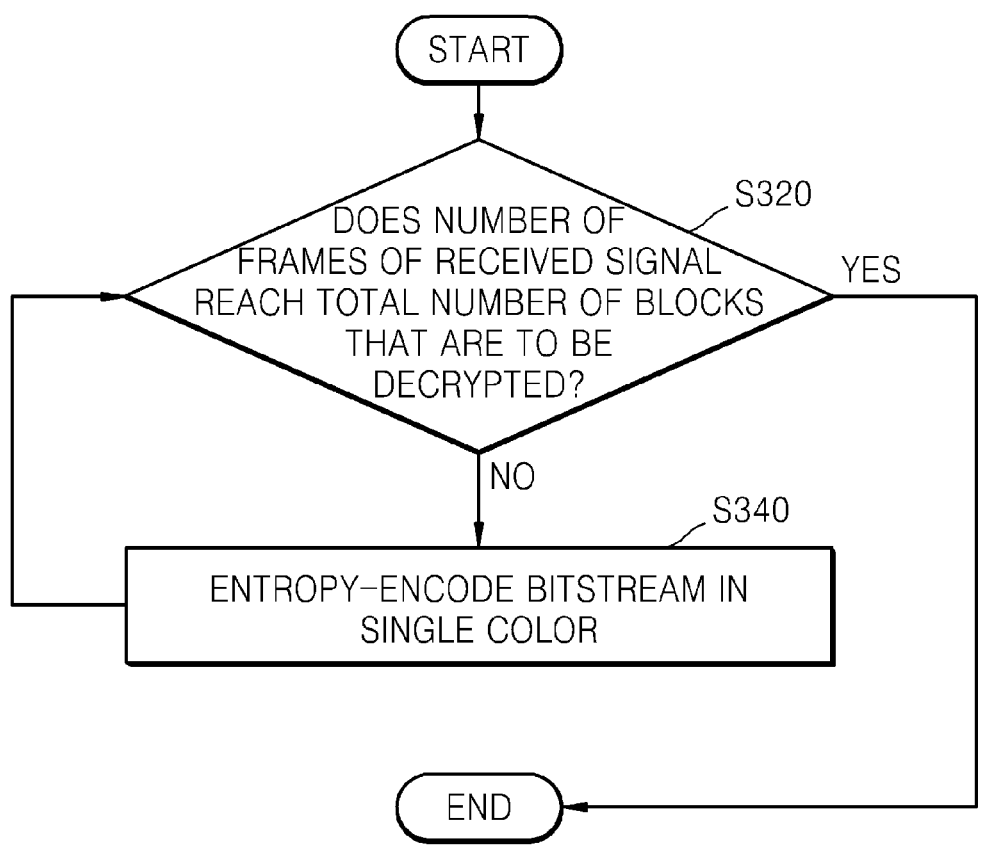

COMPLEMENTING BITSTREAM ERROR AND DECODING

CROSS-REFERENCE TO RELATED PATENT APPLICATION

This application claims the benefit of Korean Patent Application No. 2008-0009674, filed on Jan. 30, 2008, in the Korean Intellectual Property Office, the disclosure of which is incorporated herein in its entirety by reference.

BACKGROUND OF THE INVENTION

The present invention relates to processing of a signal transmitted in a bitstream and an apparatus for processing the signal.

Analog signals in a real-world system are sampled, quantized, and converted into digital signals to transmit the digitized version of the analog signals. Transmitting the digital signals improves the quality of the sound or image but increases the amount of data.

The digital signals can be compressed to compensate for the increase in the amount of data during digitization. Without such data compression, channel bandwidths needed to transmit the digital image information or audio information are not available, making it impossible or difficult to transmit the digital image information or audio information. In this regard, various types of compression methods can be used including representative compression methods such as JPEG regarding still images or MPEG regarding motion pictures.

Because a transmission bit rate or a real-time processing bit rate is determined according to the characteristics of a transmission channel, the compressed data is transmitted in a state where maximum sound quality or maximum image quality is secured at the determined bit rate. Therefore, decoders for optimally restoring the transmitted data and encoders for encoding the data to effectively use a transmission rate can be used.

Also, the compressed digital signal is transmitted in a bitstream that has a continuously transmitted bit rate, and the transmitted bitstream is restored to original signals by a decoder included in a receiving terminal during which a bitstream error often occurs. For example, when the bitstream is transmitted to a wireless network in which errors easily occur among a variety of heterogeneous networks, the bitstream error may occur due to a transmission error at a receiving side.

Due to the bitstream error, the bitstream may not be partially or completely restored when the hardware decoder decodes or decrypts the bitstream. For example, the bitstream error causes a partially broken image or sound that is harsh to the ears. Furthermore, the hardware decoder may be unavailable or a wrong calculation may destabilize a system.

SUMMARY OF THE INVENTION

The present specification describes techniques, systems and apparatus for complementing a bitstream error so that a hardware decoder can stably decrypt a bitstream. For example, the specification describes a preprocessor and a decoding apparatus that includes the preprocessor for complement a bitstream error before a hardware decoder decodes the erred bitstream.

In one aspect, a method of complementing a bitstream error includes receiving a bitstream; detecting an error from the received bitstream; and complementing the detected error before decrypting the bitstream.

Implementations can optionally include one or more of the following features. The error may be detected from the received bitstream by detecting types of signals of the bitstream and applying different error detection methods based on the detected types of signals. The detected error may be complemented by applying different complementing methods based on the types of signals.

The bitstream may include a Join Photographic Coding Experts Group (JPEG) bitstream that carries a compressed image file to be decrypted and associated information including a size of the compressed image file. Detecting the error can include comparing a number of read bits of the compressed image file to be decrypted with the associated size of the compressed image file included in the bitstream; and detecting the error in the bitstream based on a result of the comparison. When the result of the comparison indicates that the number of read bits is smaller than or the same as the associated size of the compressed image file, the bitstream can be detected as a normal bitstream and the normal bitstream can be decrypted. When the result of the comparison indicates that the number of read bits is greater than the associated size of the compressed image file, the error in the bitstream can be detected. Complementing the detected error may include: determining whether an indicated number of blocks of the compressed image file equals a total number of blocks to be decrypted; and entropy-encoding an erred part of the bitstream in a single color based on a result of the determining whether the indicated number of blocks of the compressed image file equals the total number of blocks to be decrypted. Complementing the detected error can include determining whether the indicated number of blocks of the compressed image file equals the total number of blocks to be decrypted again after entropy-encoding the erred part of the bitstream; and ending the complementing of the detected error when detecting that the indicated number of blocks of the compressed image file after the entropy-encoding equals the total number of blocks to be decrypted.

The bitstream may be a Moving Picture Experts Group (MPEG) signal having correlation between frames. Detecting the error can include determining whether the received bitstream includes all corresponding frames; and detecting the error in the received bitstream when the received bitstream does not include at least one corresponding frame. Complementing the detected error may include: determining whether the received bitstream equals a total number of frames to be decrypted; determining whether the received bitstream includes the all corresponding frames; and when detecting that the received bitstream does not include the at least one corresponding frame, inserting a frame previous to a not included corresponding frame in an expected location of the not included corresponding frame. The received bitstream can include a bitstream with regard to a compressed signal required to be decrypted.

In another aspect, a preprocessor for complementing a bitstream error includes: a bitstream receiving unit to receive a bitstream; an error detecting unit in communication with the bitstream receiving unit to detect an error in the received bitstream; and an error correcting unit in communication with the error detecting unit to receive a detection result from the error detecting unit and complement the detected error in the received bitstream. The error correcting unit can complement the detected error to generate a complemented bitstream.

Implementations can optionally include one or more of the following features. The error detecting unit may include: a signal type detecting unit to detect types of signals of the received bitstream; and an individual error detecting unit detecting in communication with the signal type detecting unit to detect the bitstream error with respect to each detected signal type obtained by the signal type detecting unit. The error correcting unit may include an individual error correcting unit corresponding to the individual error detecting unit.

The bitstream can include a Joint Photographic Experts Group (JPEG) bitstream that carries a compressed image file to be decrypted and associated information including a size of the compressed image file. The error detecting unit can compare a number of read bits of the compressed image file to be decrypted with the size of the compressed image file, and detect the error in the received bitstream based on a result of the comparison. The error correcting unit can entropy-encode an erred part of the received bitstream in a single color using the detected error until the number of blocks of the compressed image file equals the total number of blocks to be decrypted. The received bitstream can include an MPEG signal having correlations between frames. The error detecting unit can determine whether the received bitstream includes all corresponding frames and detect the error in the bitstream based on the determination of whether the received bitstream includes the all corresponding frames. The error correcting unit, when the error detecting unit determines that the received bitstream does not include at least one corresponding frame, can insert a frame previous to a not included corresponding frame in an expected location of the not included corresponding frame to complement the error detection.

In another aspect, a decoding apparatus for stably decrypting a bitstream can include: a preprocessor that includes a bitstream receiving unit to receive a bitstream; an error detecting unit in communication with the bitstream receiving unit to detect an error in the received bitstream; and an error correcting unit in communication with the error detecting unit to receive a detection result from the error detecting unit and complement the detected error in the received bitstream. The error correcting unit complements the detected error to generate a complemented bitstream. The apparatus includes a hardware decoder in communication with the preprocessor to decrypt the complemented bitstream generated by the preprocessor.

Implementations can optionally include one or more of the following features. The bitstream can include a Joint Photographic Experts Group (JPEG) bitstream that carries a compressed image file to be decrypted and associated information including a size of the compressed image file. The error detecting unit can compare a number of read bits of the compressed image file to be decrypted with the size of the compressed image file and detect an error in the received bitstream based on the comparison. The error correcting unit can entropy-encode an erred part of the received bitstream in a single color until a number of blocks of the compressed image file equals a total number of blocks to be decrypted. The bitstream can include an MPEG signal having correlations between frames. The error correcting unit can determine whether the received bitstream includes all corresponding frames and detect the error from the bitstream based on the determination of whether the received bitstream includes the all corresponding frames. The error correcting unit, when the error detecting unit determines that the bitstream does not include at least one corresponding frame, can insert a frame previous to a not included corresponding frame in an expected location of the not included corresponding frame to complement the error detection.

The error detecting unit may include a signal type detecting unit and an individual error detecting unit. The error correcting unit may include an individual error correcting unit corresponding to the individual error detecting unit.

According to another aspect of the present invention, there is provided a computer readable recording medium storing a program for executing the method of complementing a bitstream error, the method comprising: receiving a bitstream; detecting an error from the received bitstream; complementing the detected error, wherein the detected error is complemented before a hardware decoder decrypts the bitstream.

BRIEF DESCRIPTION OF THE DRAWINGS

FIG. 2A is a detailed flowchart illustrating an example method of detecting an error from a bitstream with respect to the method of complementing the bitstream error shown in FIG. 1;

FIG. 2B is a detailed flowchart illustrating another example method of detecting an error from a bitstream;

FIG. 3A is a detailed flowchart illustrating an example method of complementing a bitstream error according to the method of detecting the error from the bitstream shown in FIG. 2A;

DETAILED DESCRIPTION OF THE INVENTION

Figure 1:
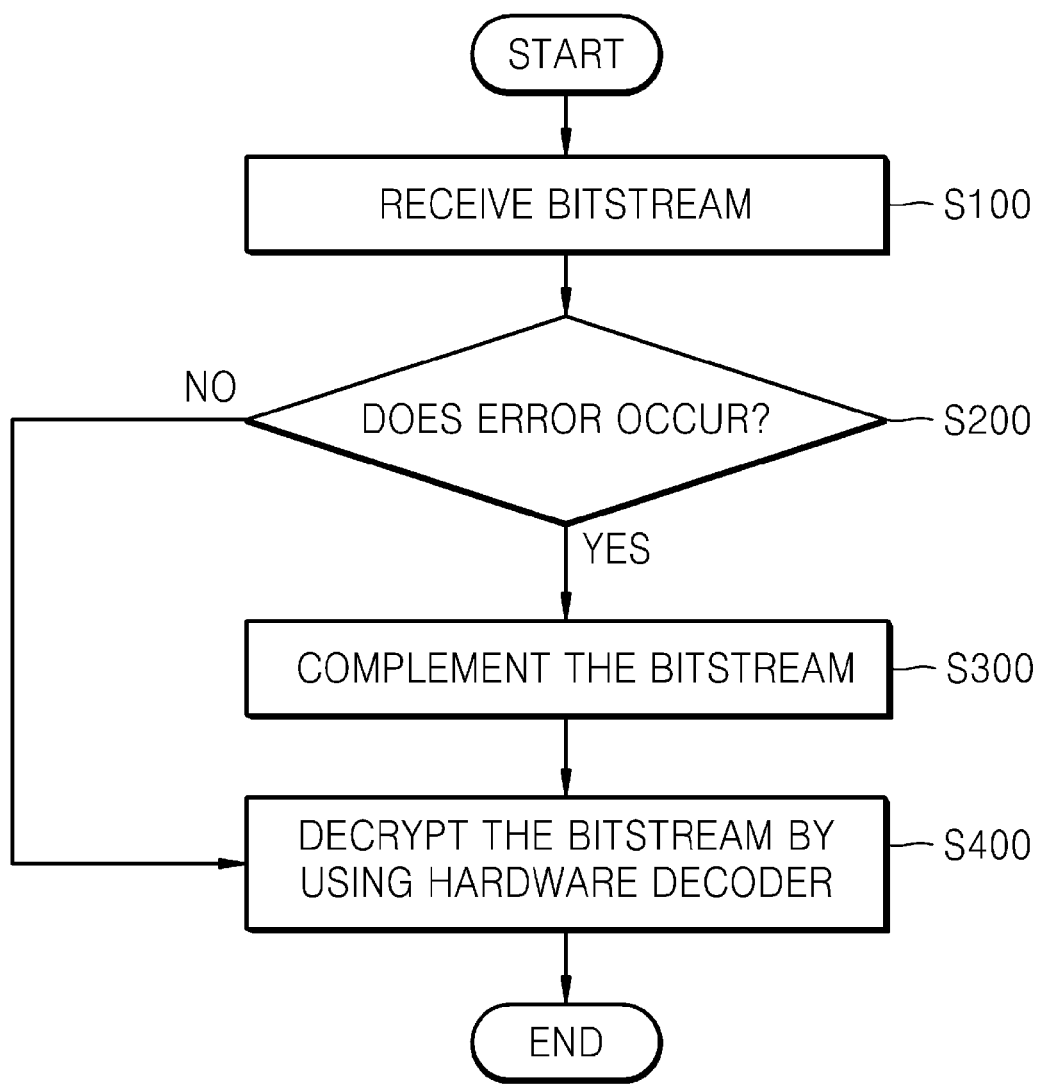
FIG. 1 is a flowchart illustrating an example method of complementing a bitstream error.

FIG. 1 is a flowchart illustrating an example method of complementing a bitstream error according to one embodiment. Referring to FIG. 1, a receiving side or decoding apparatus, such as a terminal, receives a compressed bitstream over a network (S100). An error may occur in the received bitstream due to a problem with the bitstream or the network. The receiving side determines whether an error has been detected in the received bitstream (S200).

A variety of methods may be used to determine whether the error has been detected in the received bitstream. FIGS. 2A and 2B below show example methods of detecting the bitstream error.

Figure 3B:
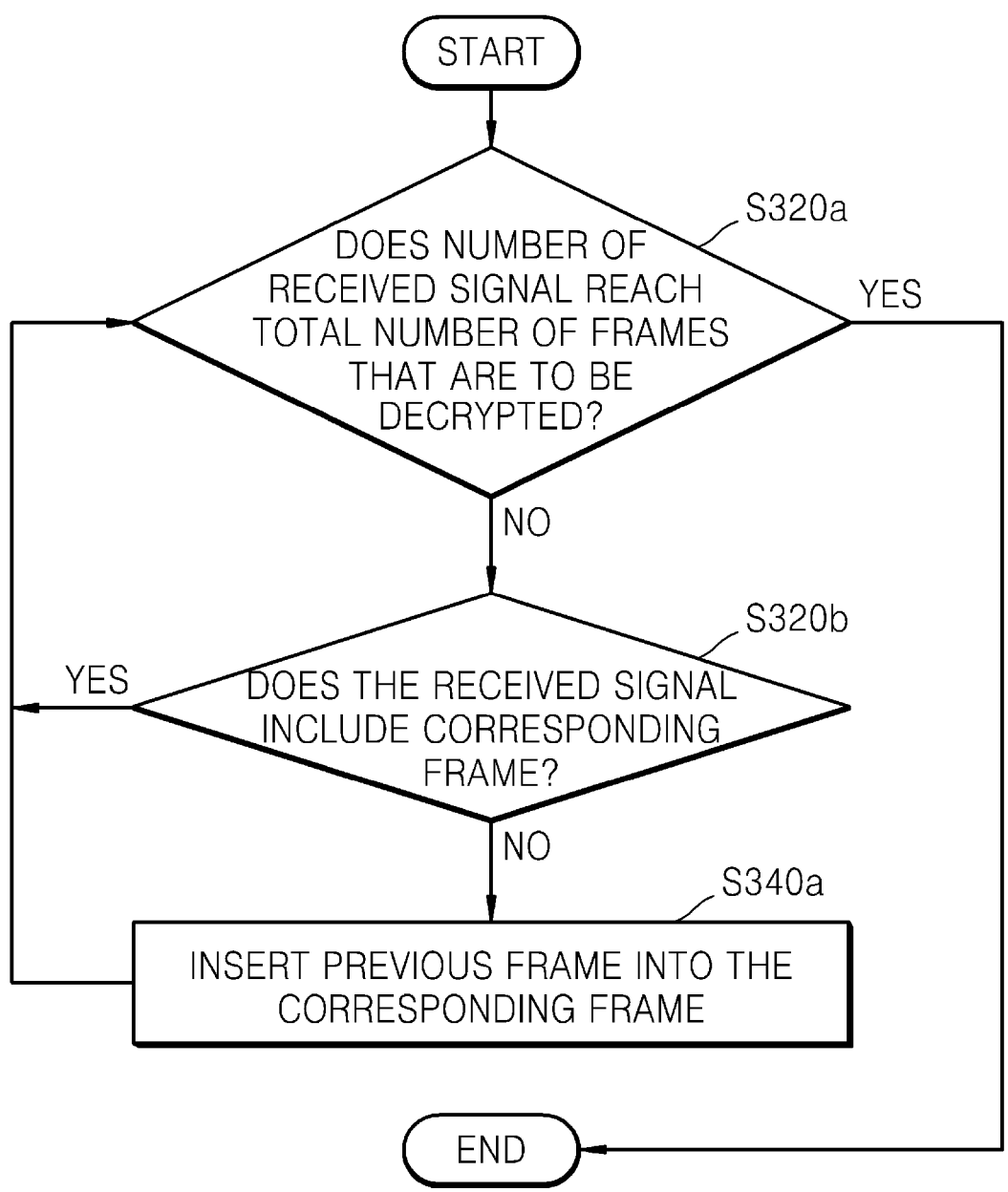
FIG. 3B is a detailed flowchart illustrating an example method of complementing a bitstream error according to the method of detecting the error from the bitstream shown in FIG. 2B.

When the receiving side detects an error in the received bitstream, i.e., the error is detected from the bitstream, the receiving side complements the detected bitstream error by using an appropriate method (S300). A variety of methods of complementing the detected bitstream error may be used. FIGS. 3A and 3B show example methods of complementing the detected bitstream error according to the methods described with reference to FIGS. 2A and 2B. Also, complementing the detected bitstream error does not involve restoring the original bitstream. Instead, complementing the detected bitstream prevents the detected bitstream error from being recognized by appropriately processing the detected bitstream error.

After the receiving side complements the detected bitstream error, a hardware decoder decrypts the complemented bitstream (S400). Otherwise, when the receiving side does not detect an error in the received bitstream, the hardware decoder decrypts the bitstream that has not been complemented.

The detected bitstream error is complemented before the hardware decoder decrypts the bitstream, thereby assisting the hardware decoder in decrypting the bitstream and stably restoring a signal. The detected bitstream error may be complemented by using hardware and/or software.

FIG. 2A is a detailed flowchart illustrating an example method of detecting an error from a bitstream (S200) with respect to the method of complementing the detected bitstream error shown in FIG. 1. For example, an image signal can be transmitted in a JPEG (Join Photographic Coding Experts Group) compressed bitstream.

Referring to FIG. 2A, the received image signal includes the compressed image file and associated information, such as the size of the compressed image file. After the image signal is received, the receiving side determines whether the number of read bits of the compressed image file of the received image signal to be decrypted is smaller than or the same as the size indicated by the associated information (S220). If the bitstream is accurately received, the number of read bits of the compressed image file to be decrypted is the same as or smaller than the indicated size of the compressed image file. Otherwise, if the bitstream is not accurately received, the number of read bits of the compressed image file to be decrypted is greater than the indicated size of the compressed image file. That is, a part of the bitstream to be read is not received or is damaged due to an error in the bitstream.

Therefore, when the number of read bits of the compressed image file to be decrypted is the same as or smaller than the indicated size of the compressed image file, the receiving side determines that the bitstream is normal or accurate. However, when the number of read bits of the compressed image file to be decrypted is greater than the indicated size of the compressed image file, the receiving side determines that an error has occurred in the bitstream.

When the number of read bits of the compressed image file to be decrypted is the same as or smaller than the size of the compressed image file, the normally received compressed image file is decoded (S400). The receiving side determines whether an error has occurred in the bitstream with respect to a next received compressed image file (S220). When the receiving side determines that an error has occurred in the bitstream, i.e., the number of read bits of the compressed image file to be decrypted is greater than the indicated size of the compressed image file, the receiving side detects the error from the compressed image file (240). The error detection can be repeated for each received compressed image file.

The error may be detected by using software and/or hardware disposed before the hardware decoder.

FIG. 2B is a detailed flowchart illustrating another method of detecting an error from a bitstream (S200). For example, an image signal can be transmitted in an MPEG (Moving Picture Experts Group) compressed bitstream having correlation between frames after the image signal is compressed. The MPEG image can be sent in multiple bitstreams. One bitstream can include multiple frames, and thus missing frames can be found in a received bitstream by determining the correlation between frames.

Referring to FIG. 2B, the receiving side determines whether a received bitstream includes all corresponding frames to be transmitted (S220a). When the receiving side determines that the all corresponding frames are included in the received bitstream, the receiving side decodes the compressed image file (the received bitstream) into image signal (S400a). The receiving side determines whether a next bitstream includes all corresponding frames (S220a). Otherwise, when the received bitstream does not include at least one corresponding frame, the receiving side determines that an error has occurred in the bitstream of the compressed image file (S240a).

The correlation between transmitted frames may be used to determine whether a corresponding frame is included in the received bitstreams. Because the transmitted frames in the bitstreams are correlated, previous and subsequent frames have their respective information. Thus, when a corresponding frame is not included in a decoder buffer memory, the receiving side determines that the corresponding frame is damaged.

Software and/or hardware may be used to perform the method of detecting the error from the bitstream. The method may differ based on the types of received signals. The receiving side may include a determining or detecting unit for determining or detecting the types of received signals and determining or detecting an error in each of the received signals based on the determined types of the received signals.

FIG. 3A is a detailed flowchart illustrating an example method of complementing a bitstream error according to the method of detecting the error from the bitstream shown in FIG. 2A. An example process of complementing the error that occurs in a JPEG image signal is described below.

Referring to FIG. 3A, is the receiving side determines whether the number of blocks of the compressed image file in which the error occurs equals to the total number of blocks that are to be decrypted (S320). Each block represents an elementary unit (e.g., a pixel) for expressing an image. The total number of blocks represents the number of blocks or elementary units included in a normal compressed image file and is received as associated information. The total number of blocks to be decrypted is the previously determined number of blocks with regard to an image file. As described in the foregoing, when an error occurs in a bitstream, because the number of read bits of the bitstream is greater than the size of a received image file, the detected error of the received image file needs be complemented. That is, when the error occurs in the compressed image file, the number of blocks of the compressed image file is smaller than the total number of blocks and thus an error of a missing part of the compressed image file must be complemented.

When the number of blocks of the compressed image file does not equal the total number of blocks, a part of the bitstream in which the error occurs is entropy-encoded in a single color (S340). When a hardware decoder decrypts the error detected bitstream, the entropy-encoded part of the bitstream is restored in a single color, such as white or another color similar to a neighboring color. Therefore, a partially or completely damaged image or an image that is not decrypted can be restored. The hardware decoder stably decrypts the image, and an erred part of the image is processed in a single color and is restored to a stable image.

FIG. 3B is a detailed flowchart illustrating an example method of complementing a bitstream error according to the method of detecting the error from the bitstream shown in FIG. 2B. A process of complementing the error that occurs in a bitstream having correlations between frames is described below.

Referring to FIG. 3B, the receiving side determines whether the number of frames of a received bitstream equals the total number of frames to be decrypted (S320a). The receiving side determines whether the received bitstream includes a corresponding frame (S320b). When the receiving side determines that the received bitstream includes the corresponding frame, operation 320a is again performed. When the corresponding frame is lost or missing, the missing corresponding frame is complemented (S340a). Complementing the lost frame includes inserting a previous frame into a location of the lost corresponding frame. Frames having correlations have a similar bitstream structure. Therefore, when the corresponding frame is complemented by inserting the previous frame, a whole bitstream is stably restored while not influencing the whole bitstream.

After the corresponding frame is complemented, operation 320*a* is again performed. When the receiving side determines that the number of frames of the received bitstream equals the total number of frames to be decrypted, the process of complementing the error is completed. Software and/or hardware may be used to perform the method of complementing the error of the bitstream having correlations between frames.

These two examples are describes only to illustrate the method of complementing the bitstream error, and thus the subject matter of the present specification is not limited thereto. A variety of methods of complementing the bitstream error may be used before the hardware decoder decrypts the bitstream.

Figure 4:
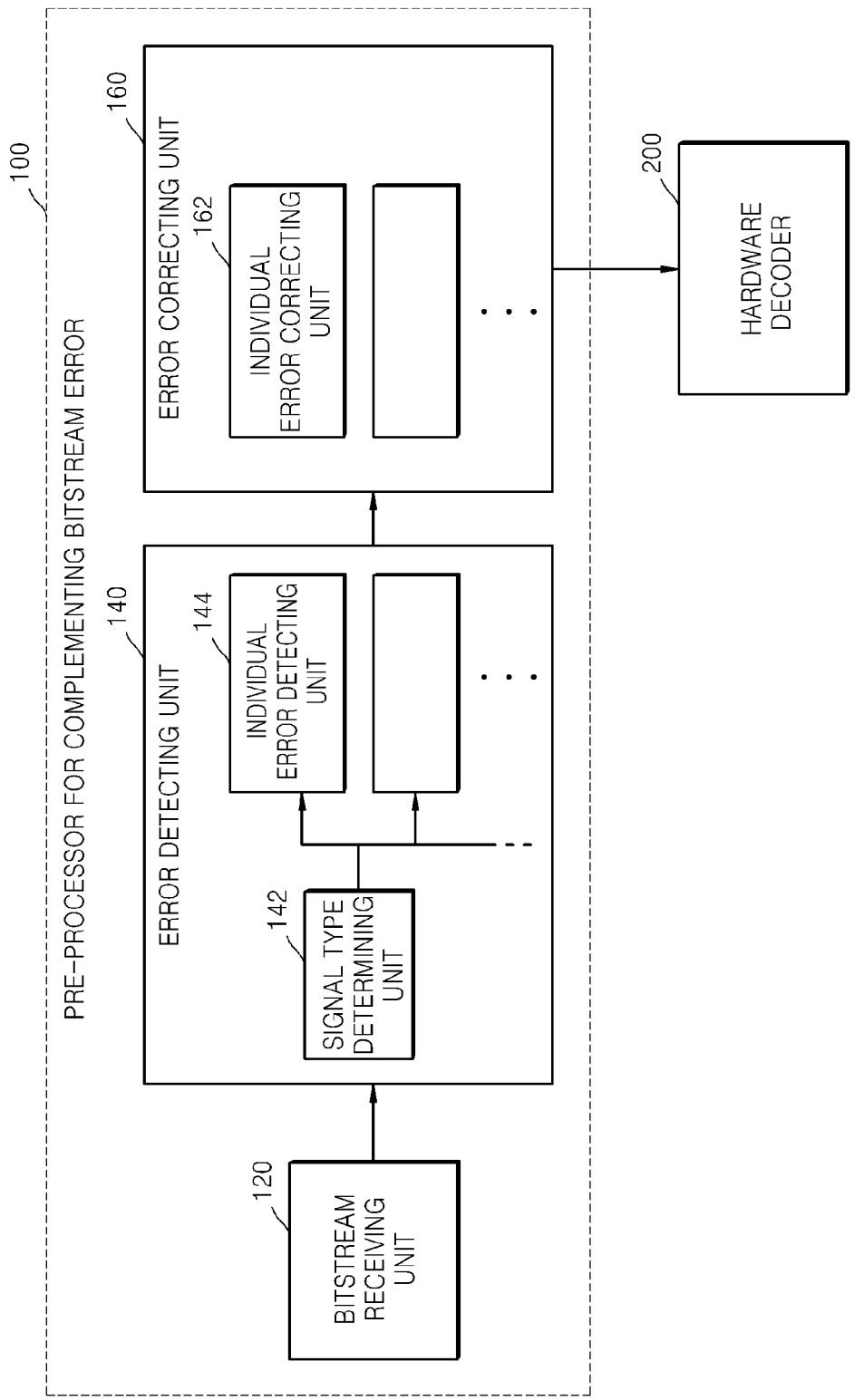
FIG. 4 is a block diagram of a decoding apparatus including a pre-processor for complementing a bitstream error.

FIG. 4 is a block diagram of an example decoding apparatus including a pre-processor 100 for complementing a detected bitstream error. Referring to FIG. 4, the decoding apparatus includes the pre-processor 100 for complementing the detected bitstream error and a hardware decoder 200. The pre-processor 100 for complementing the detected bitstream error detects and complements the bitstream error before the hardware decoder 200 decrypts the bitstream.

The pre-processor 100 for detecting and complementing the bitstream error includes a bitstream receiving unit 120, an error detecting unit 140, and an error correcting unit 160. The bitstream receiving unit 120 receives a transmitted bitstream. The error detecting unit 140 comprises a signal type determining unit 142 and an individual error detecting unit 144. The signal type determining unit 142 determines the type of a received signal. The individual error detecting unit 144 determines the bitstream error by using an appropriate method according to the determined type of the received signal. Thus, an individual error detecting unit 144 can be provided for each determined type of the received signal. The method of determining the bitstream error is described with reference to FIGS. 2A and 2B above.

Although the error detecting unit 140 may comprise the individual error detecting unit 144 with respect to each of the received signals, a single detecting unit may determine the bitstream error with respect to all received signals. A single detecting unit or a plurality of detecting units (see empty boxes below 144) may be realized using software and/or hardware.

The error correcting unit 160 may include an individual error correcting unit 162 corresponding to the individual error detecting unit 144 of the error detecting unit 140. The individual error correcting unit 162 complements the bitstream error by using an appropriate method according to the bitstream in which the error occurs. The method of complementing the bitstream error is described with reference to FIGS. 3A and 3B above.

Although the error correcting unit 160 may include the individual error correcting unit 162 with respect to each of the received signals, a single correcting unit 162 may be used to determine the bitstream error. A single correcting unit 162 or a plurality of individual error correcting units 162 (see boxes below 162) may be realized using software and/or hardware.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A method of complementing a bitstream error, the method comprising:
    using a processor to perform the steps of;
    receiving a bitstream over a network by a terminal;
    detecting an error in the received bitstream, wherein detecting the error comprises comparing a number of read bits of a compressed image file to be decrypted with an associated size of the compressed image file included in the bitstream, and detecting the error in the bitstream based on a result of the comparison; and
    complementing the detected error before decrypting the bitstream, wherein complementing the detected error comprises determining whether an indicated number of blocks of the compressed image file equals a total number of blocks to be decrypted, and entropy-encoding an erred part of the bitstream in a single color based on a result of the determining whether the indicated number of blocks of the compressed image file equals the total number of blocks to be decrypted.

2. The method of claim 1, wherein detecting the error in the received bitstream comprises:
    detecting types of signals of the bitstream; and
    applying different error detection methods based on the detected types of signals.

3. The method of claim 2, wherein complementing the detected error comprises applying different complementing methods based on the detected types of signals.

4. The method of claim 1, wherein the received bitstream comprises a Join Photographic Coding Experts Group (JPEG) bitstream that carries a compressed image file to be decrypted and associated information including a size of the compressed image file.

5. The method of claim 4, comprising:
    when the result of the comparison indicates that the number of read bits is smaller than or same as the associated size of the compressed image file, detecting that the received JPEG bitstream is normal and decrypting the normal bitstream; and
    when the result of the comparison indicates that the number of read bits is greater than the associated size of the compressed image file, detecting the error in the bitstream.

6. The method of claim 1, wherein complementing the detected error comprises:
    determining whether the indicated number of blocks of the compressed image file equals the total number of blocks to be decrypted again after entropy-encoding the erred part of the bitstream; and
    ending the complementing of the detected error when detecting that the indicated number of blocks of the compressed image file after the entropy-encoding equals the total number of blocks to be decrypted.

7. The method of claim 1, wherein the received bitstream comprises a Moving Picture Experts Group (MPEG) signal having correlations between frames, and
    wherein detecting the error comprises:
        determining whether the received bitstream includes all corresponding frames; and
        detecting the error in the received bitstream when the received bitstream does not include at least one corresponding frame.

8. The method of claim 7, wherein complementing the detected error comprises:
    determining whether the received bitstream equals a total number of frames to be decrypted;
    determining whether the received bitstream includes the all corresponding frames; and
    when detecting that the received bitstream does not include the at least one corresponding frame, inserting a frame previous to a not included corresponding frame in an expected location of the not included corresponding frame.

9. The method of claim 1, wherein the received bitstream comprises a bitstream with regard to a compressed signal required to be decrypted.

10. A preprocessor for complementing a bitstream error, the preprocessor comprising:
    a bitstream receiving unit configured to receive a bitstream over a network;
    an error detecting unit in communication with the bitstream receiving unit to detect an error in the received bitstream, wherein the error detecting unit compares a number of read bits of a compressed image file to be decrypted with a size of the compressed image file, and detects the error in the received bitstream based on a result of the comparison; and
    an error correcting unit in communication with the error detecting unit to receive a detection result from the error detecting unit and complement the detected error in the received bitstream, wherein the error correcting unit entropy-encodes an erred part of the received bitstream in a single color until the number of blocks of the compressed image file equals the total number of blocks to be decrypted and complements the detected error to generate a complemented bitstream,
    wherein the bitstream receiving unit, the error detecting unit and error correcting unit comprise hardware of a terminal, respectively.

11. The preprocessor of claim 10, wherein the error detecting unit comprises:
    a signal type detecting unit to detect types of signals of the received bitstream; and an individual error detecting unit in communication with the signal type detecting unit to detect the bitstream error with respect to each detected signal type obtained by the signal type detecting unit.

12. The preprocessor of claim 11, wherein the error correcting unit comprises an individual error correcting unit corresponding to the individual error detecting unit.

13. The preprocessor of claim 10, wherein the received bitstream comprises a Joint Photographic Experts Group (JPEG) bitstream that carries a compressed image file to be decrypted and associated information including a size of the compressed image file.

14. The preprocessor of claim 10, wherein the received bitstream comprises an MPEG signal having correlations between frames;
   wherein the error detecting unit determines whether the received bitstream includes all corresponding frames and detects the error in the bitstream based on the determination of whether the received bitstream includes the all corresponding frames;
   wherein the error correcting unit, when the error detecting unit determines that the received bitstream does not include at least one corresponding frame, inserts a frame previous to a not included corresponding frame in an expected location of the not included corresponding frame to complement the error detection.

15. A decoding apparatus for stably decrypting a bitstream comprising:
   a preprocessor comprising:
   a bitstream receiving unit to receive a bitstream;
   an error detecting unit in communication with the bitstream receiving unit to detect an error in the received bitstream; and
   an error correcting unit in communication with the error detecting unit to receive a detection result from the error detecting unit and complement the detected error in the received bitstream,
   wherein the error correcting unit complements the detected error to generate a complemented bitstream; and
   a hardware decoder in communication with the preprocessor to decrypt the complemented bitstream generated by the preprocessor,
   wherein the bitstream comprises a Joint Photographic Experts Group (JPEG) bitstream that carries a compressed image file to be decrypted and associated information including a size of the compressed image file,
   wherein the error detecting unit compares a number of read bits of a compressed image file to be decrypted with a size of the compressed image file and detects an error in the received bitstream based on the comparison, and
   wherein the error correcting unit entropy-encodes an erred part of the received bitstream in a single color using the detected error until a number of blocks of the compressed image file equals a total number of blocks to be decrypted.

16. The decoding apparatus of claim 15, wherein the bitstream comprises a Joint Photographic Experts Group (JPEG) bitstream that carries a compressed image file to be decrypted and associated information including a size of the compressed image file.

17. The decoding apparatus of claim 15, wherein the bitstream comprises an MPEG signal having correlations between frames;
   wherein the error detecting unit determines whether the received bitstream includes all corresponding frames and detects the error from the bitstream based on the determination of whether the received bitstream includes the all corresponding frames; and
   wherein the error correcting unit, when the error detecting unit determines that the bitstream does not include at least one corresponding frame, inserts a frame previous to a not included corresponding frame in an expected location of the not included corresponding frame to complement the error detection.

18. The decoding apparatus of claim 15, wherein the error detecting unit comprises a signal type determining detecting unit and an individual error detecting unit; and
   the error correcting unit comprises an individual error correcting unit corresponding to the individual error detecting unit.

* * * * *